Sept. 7, 1937.   L. A. VON TILL   2,092,192
SEALED PACKAGE
Filed Aug. 22, 1934
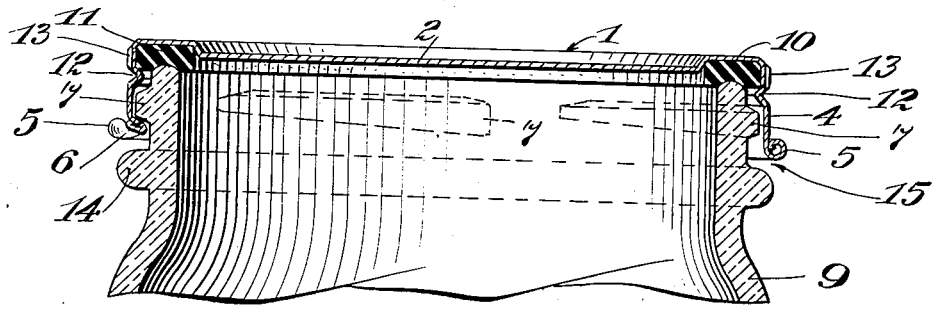
Fig. 2.
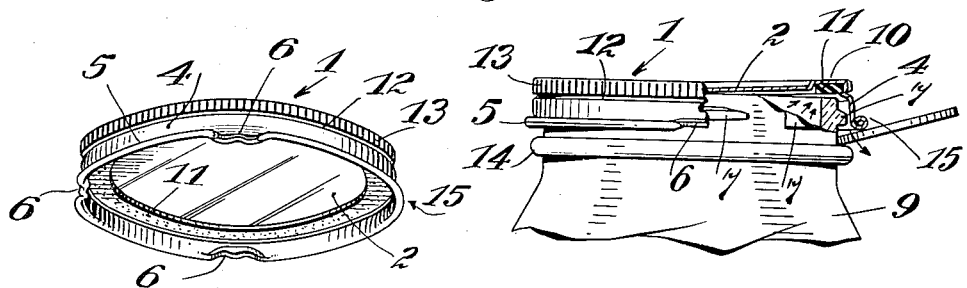
Fig. 1.   Fig. 3.
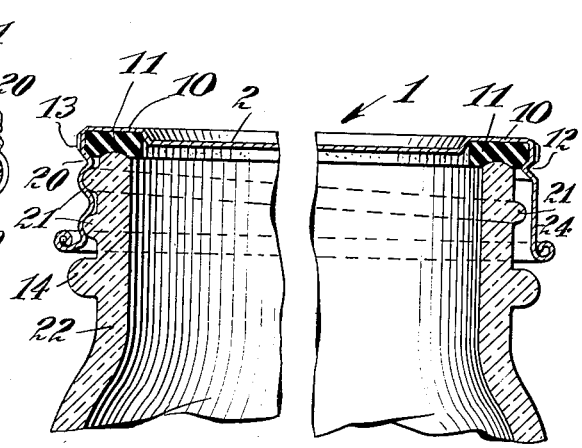
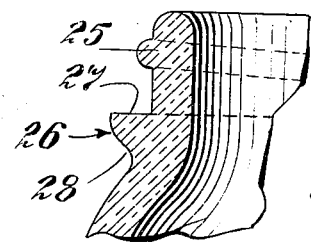
Fig. 6.   Louis A. Von Till INVENTOR
BY Norman H. Holland
his ATTORNEY Patented Sept. 7, 1937

2,092,192

UNITED STATES PATENT OFFICE 2,092,192

SEALED PACKAGE

Louis A. Von Till, Brooklyn, N. Y., assignor to Anchor Cap & Closure Corporation, Long Island City, N. Y., a corporation of New York Application August 22, 1934, Serial No. 740,854

5 Claims. (Cl. 215—43)

The present invention relates to closures, and more particularly to screw closure caps for providing vacuum sealed packages.

Screw caps are very popular because of the ease and simplicity with which they can be applied and removed. The ultimate consumers, usually housewives, are very familiar with them and know how to remove them. In addition, screw caps can be removed without mutilation and can be used thereafter to reseal the package while the contents thereof are being dispensed.

In order to provide hermetically sealed packages rubber gaskets are utilized. However, the friction between the glass and the rubber, or between the rubber and the cap, makes it difficult to unscrew the cap. If, as customary, the packages are sealed hot or with a partial vacuum therein the difficulty of removal is even greater because the vacuum within the container increases the downward pull on the caps which increases the frictional resistance to rotation. Because of this, the housewife has difficulty in removing the cap, and in some cases, cannot remove the cap. This occasions complaints and dissatisfaction.

The present invention aims to eliminate the above difficulties by providing a screw cap forming a hermetic or vacuum seal through the intermediation of a rubber gasket, the cap being readily removed from the container. The present invention, further aims to accomplish this without increasing the cost of the package or impairing the effectiveness of the seal.

An object of the present invention is to facilitate the removal of caps from containers.

Another object of the invention is to simplify the removal of hermetically sealed screw caps without increasing the cost thereof.

Another object of the invention is to facilitate the removal of a screw cap forming a seal by means of a rubber gasket without mutilating the cap.

Another object of the invention is to provide a screw cap forming a vacuum seal, the cap facilitating release of vacuum within the container prior to unscrewing thereof without mutilating the cap.

Another object of the invention is to apply the principles of the invention to both continuous thread and interrupted thread or lug screw caps.

Another object of the invention is to provide a vacuum closure cap with a wire edge adapted to be pried up at one point to break the vacuum, the wire edge serving to give a good purchase for a prying tool.

Another object of the invention is to provide an improved container adapted to facilitate removal of a cap sealed thereon.

A further object of the invention is to provide a vacuum sealed package having a closure cap adapted to form a vacuum seal and adapted also to form a hermetic reseal with the same closure.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a perspective view showing a preferred embodiment of the invention;

Fig. 2 is a fragmentary sectional view showing a cap sealed on a container;

Fig. 3 is a fragmentary sectional view of the cap about to be removed from the container, the container being shown in elevation;

Fig. 4 is a perspective view showing another embodiment of the invention;

Fig. 5 is a fragmentary sectional view of the cap shown in Fig. 4 applied upon a container; and Fig. 6 is a fragmentary sectional view of another type of container.

Referring again to the drawing, and more particularly Figs. 1, 2, and 3, there is shown a closure cap 1 having a cover portion 2 and a depending skirt 4. The lower edge of the skirt may be rolled, upwardly and outwardly, to form what is commonly known as a bead or wire edge 5.

A plurality of lugs or projections 6 are formed in the skirt of the cap and preferably from the bead 5 thereof at desired intervals about its periphery for engagement with suitable projections or threads 7 on a container 9. A suitable recess or groove 10 may be formed in the cover part 2 for receiving a gasket 11 adapted to provide a hermetic or vacuum seal and the gasket may be held in the groove 10 by an inwardly extending ledge 12 formed in the skirt of the cap. If desired, the gasket may be otherwise secured to the cap, for example by vulcanization or by utilizing a rubber composition which will adhere to the cap. Suitable knurls or corrugations 13 may be provided in the skirt to facilitate gripping the cap to unscrew it. Preferably the container is provided with the usual bead or shoulder 14 formed beneath the container threads.

If, as customary, the containers are sealed while the contents are hot, or are sealed in a vacuum chamber, a vacuum seal is provided. The vacuum within the container increases the downward pull on the cap and increases the frictional resistance to rotation, thus making it difficult to unscrew the cap without first releasing the vacuum. To facilitate breaking the vacuum prior to unscrewing the cap, the present invention provides a novel arrangement of cap lugs or projections 6 and container threads 7. Preferably, the container is provided with the usual interrupted thread finish which comprises a number of symmetrically arranged lugs 7, herein shown as four in number. A cap adapted to fit on the container is provided with three lugs, spaced to engage three of the thread projections on the container. To accomplish this the lugs 6 are spaced asymmetrically about the circumference of the skirt. Two of the lugs are diametrically opposite each other and the third lug is spaced between the opposite lugs. At the portion of the bead 5, where a fourth lug would normally be provided, the lug is omitted. As a result, a continuous circumferential portion of the skirt, preferably greater than one-third and less than one half the circumference of the skirt does not engage the container. In this manner, the cap, when sealed on the container engages the container projections at portions located in only three circumferential quarters of the container. The three lugs, particularly with a vacuum in the container, are sufficient to form a good seal. By inserting a coin or knife between the shoulder or bead 14 on the container and the wire edge at the portion 15 where the lug is omitted, the cap may be pried upwardly to raise the gasket 11 and vent the package to break the vacuum seal (Fig. 3). Once the vacuum is released, the cap may be readily unscrewed in the usual manner. The three lugs which engage the container threads, in addition to the downward pull of the vacuum in the package are effective to provide a secure seal which cannot be broken accidentally.

An important advantage of the above described cap is that it can be made with only a slight change in existing machinery. This may be done by substituting a die or other cap forming tool having one of the lug forming portions omitted therefrom. Another feature is that the caps may be stamped or lithographed to indicate the point at which the cap should be pried upwardly. In this manner an improved cap is provided without materially increasing the cost thereof.

While the present invention is described as being preferably carried out with a container having four lugs and a cap having three lugs, it will be understood that the principles thereof may be applied to containers having more than four lugs. For example, a cap having five lugs may be sealed upon a container having six lugs. At the portion where the sixth lug is omitted, the cap may be raised prior to unscrewing to release the vacuum within the container. The present invention also contemplates omitting one of the container lugs 7 thus permitting the cap to be pried upwardly at the portion where the container lug is omitted. Such containers can be made inexpensively, since the omission of the lug requires only a slight change in the neck rings or molds for making the containers.

The present invention is also applicable to continuous thread caps as shown more particularly in Figs. 4 and 5 of the drawing. A screw cap adapted to form a vacuum seal by means of a gasket, is provided with an overlapping screw thread 20 which may be either continuous or interrupted, for engaging a corresponding screw thread 21 on a container 22 and a portion 24 of the cap thread between the respective ends thereof is omitted therefrom. The portion 24 preferably has a circumferential length of about one third the circumference of the skirt and is located at a non-overlapping portion of the thread, so that the cap may be pried upwardly by inserting a suitable tool between the bead 14 and the lower edge of the cap to release the vacuum. If desired, the portion 20 or the part of the cap adjacent to the omitted thread engaging portion may have an arrow or other instructions embossed or lithographed thereon for opening the cap.

A further advantage of the above described construction is that the container threads 21 and the portion 24 of the skirt of the cap may be spaced circumferentially with respect to the container so that the non-engaging portion 24 is at the label side or front of the container when the cap is applied thereto. In this manner a consumer reading the label before opening the package also sees these instructions and has no difficulty in removing the cap. The portion 24 does not mar the appearance of the package and, therefore, may be located at a conspicuous place.

The present invention may also be practiced by omitting one or more portions of the container thread, to permit the cap to be pried upwardly. Where such containers are utilized, caps having complete screw threads may be applied thereto and instructions for removal may be provided on the container or the cap.

In Fig. 6 another form of container is shown having a thread 25 thereon and a suitable pryoff ledge 26. The ledge 26, which may, for convenience, be provided in a number of forms, is shown herein having a flat upper surface 27 spaced below the container thread 25 and having a side portion 28 of substantial thickness tapering downwardly and inwardly until it merges into the side wall of the container. The ledge 26 may be annular and continuous, but if desired, a relatively short circumferential ledge may be provided beneath the point at which threads or lugs of the container are omitted. In the latter instance the consumer can readily find the point at which the cap should be pried upwardly and detailed instructions are not necessary. If a continuous annular ledge is utilized, an arrow or legend should be molded on the container at the point where the thread or lug is omitted from the container to designate the point of application of the prying tool. The flat upper surface 27 of the ledge provides a suitable fulcrum portion for inserting a coin or knife and the portion 28 strengthens the ledge to prevent breakage thereof.

The present caps may be made by existing machines by substituting a forming tool having a lug or thread portion omitted therefrom. Containers made according to existing specifications may be utilized. If a container having the improved ledge 26 beneath the threads or a container having a lug or thread portion omitted therefrom is desired, existing molding machines are provided with slightly different molds for forming the ledge. In this manner the parts of the package may be made inexpensively without new and expensive machinery.

The caps are applied in the customary manner to seal the containers. If a vacuum seal is desired, containers are sealed while the contents are hot to form a partial vacuum, or the caps are applied while the containers are in a vacuum chamber. After the cap is screwed on, the gasket maintains the downward pull on the cap and assists the lugs or threads in holding the cap on the container.

In opening the package, a suitable tool such as a coin or knife is inserted between the lower edge of the cap at the portion where threads or lugs are omitted, and between the bead or pry-off ledge of the container. By pressing downwardly on the tool, the cap is raised upwardly and the gasket retaining ledge 12 raises the gasket away from the rim of the container to break the vacuum seal. If the gasket should adhere to the container, the seal between the cover portion of the cap and the gasket is broken and air may pass above the gasket. Once the vacuum is released the cap can be readily unscrewed without difficulty and can be applied to the container thereafter to provide a secure seal.

It will be seen that the present invention provides a screw closure cap which forms a secure vacuum or hermetic seal, is readily removable and may be used to reseal the container. The vacuum within the container may be released in a simple and effective manner without the use of special devices. In addition, the cap is not mutilated or distorted when the seal is broken and thus can be used again. The omission of the lug or thread portion does not mar the appearance of the package and does not impair the effectiveness of the seal. The caps cost no more than the usual screw caps and can be made inexpensively by slight changes in existing machinery.

As various changes may be made in the form, construction and arrangement of parts without departing from the spirit and scope of the invention and without sacrificing its advantages, it is to be understood that all matter herein is to be interpreted as illustrative and not in a limiting sense.

Having thus described my invention, I claim:

1. A sealed package having a partial vacuum therein comprising a container having a plurality of cap engaging lugs thereon, and a screw cap having a plurality of projections for engaging certain of said lugs, the number of projections on said cap being one less than the number of lugs on the container the omission of one of said projections indicating where said cap should be pried upwardly to break the vacuum.

2. A vacuum sealed package the pressure within the package being lower than the external pressure comprising a container having a screw thread thereon, and a screw cap having a cover portion and a depending skirt, a resilient gasket in said cap providing a vacuum seal, an annular inwardly extending projection in said skirt for holding said gasket in said cap, and a screw thread in the skirt of said cap for engaging said container thread, a portion of the cap thread between the ends thereof being interrupted to permit raising the cap at said interrupted portion to break the vacuum seal and to facilitate unscrewing the cap.

3. A sealed package having a partial vacuum therein comprising a container having a screw thread thereon, a screw closure cap adapted to form a vacuum seal having a screw thread in the skirt thereof, one of said screw threads being interrupted for a substantial portion of the circumference of the cap to facilitate raising the cap at the interrupted portion to break the vacuum seal, and a relatively short circumferential pry-off ledge on the container below the portion where said thread is interrupted to indicate the point at which the cap may be pried upwardly to break the seal.

4. A sealed package having a partial vacuum therein comprising a container having a plurality of cap engaging lugs thereon, a screw cap having a plurality of projections for engaging certain of said lugs, the number of projections on said cap being one less than the number of lugs on the container, the omission of one of said projections indicating where said cap should be pried upwardly to break the vacuum, and a pry ledge on the container to facilitate prying said cap at the omitted lug portion.

5. A sealed package having a partial vacuum therein comprising a container member having a plurality of projections thereon, and a screw cap member having a sealing gasket therein and having a plurality of projections adapted to register with and engage said projections on the container member, the number of projections on one of said members being one less than the number of projections on the other member, the projections being substantially equally spaced on the member having the greater number of projections, the omission of a projection on one of the members permitting the cap member to be pried up at said point of omission to break the vacuum, and a pry ledge on the container member to facilitate prying said cap at the place where the projection is omitted.

LOUIS A. VON TILL.